United States Patent
Jung et al.

(10) Patent No.: US 12,227,162 B2
(45) Date of Patent: Feb. 18, 2025

(54) MOTOR DRIVING CIRCUIT FOR ELECTRONIC PARKING BRAKE SYSTEM

(71) Applicant: HL MANDO CORPORATION, Pyeongtaek-si (KR)

(72) Inventors: Hee Chul Jung, Suwon-si (KR); Kyung Ran Cho, Seoul (KR); Chul Eui Park, Yongin-si (KR); Sang Woo Kim, Seongnam-si (KR)

(73) Assignee: HL MANDO CORPORATION, Pyeontaek (KR)

( * ) Notice: Subject to any disclaimer, the term of this patent is extended or adjusted under 35 U.S.C. 154(b) by 133 days.

(21) Appl. No.: 18/024,201

(22) PCT Filed: Dec. 17, 2021

(86) PCT No.: PCT/KR2021/019289
§ 371 (c)(1),
(2) Date: Mar. 1, 2023

(87) PCT Pub. No.: WO2022/131856
PCT Pub. Date: Jun. 23, 2022

(65) Prior Publication Data
US 2023/0264667 A1    Aug. 24, 2023

(30) Foreign Application Priority Data

Dec. 17, 2020   (KR) .................. 10-2020-0176982
Dec. 17, 2020   (KR) .................. 10-2020-0176983

(51) Int. Cl.
*H02K 7/14*    (2006.01)
*B60T 8/17*    (2006.01)
(Continued)

(52) U.S. Cl.
CPC ........ *B60T 8/92* (2013.01); *B60T 8/17* (2013.01); *B60T 8/885* (2013.01); *B60T 13/74* (2013.01);
(Continued)

(58) Field of Classification Search
CPC ........ H02P 3/04; H02P 29/028; H02P 29/024; H02P 5/00; B60T 8/17; B60T 8/885;
(Continued)

(56) References Cited

U.S. PATENT DOCUMENTS

2021/0394728 A1* 12/2021 Yoo ...................... B60T 8/4081

FOREIGN PATENT DOCUMENTS

JP          2020-059338 A    4/2020
KR   10-2014-0046282 A    4/2014
(Continued)

OTHER PUBLICATIONS

International Search Report (PCT/ISA/210) issued in PCT Application No. PCT/KR2021/019289 dated Mar. 29, 2022 with English Translation.
(Continued)

*Primary Examiner* — Karen Masih
(74) *Attorney, Agent, or Firm* — Harvest IP Law, LLP

(57) ABSTRACT

The present disclosure relates to a motor driving circuit of an electronic parking brake system, which is configured to include a first motor and a second motor for releasing or applying a parking brake applied to different wheels, respectively; and a first ECU and a second ECU for controlling the driving of the first motor and the second motor, respectively, wherein the second ECU is prevented from intervening in the driving of the first motor and the second motor while the first ECU drives the first motor and the second motor, and controls the driving of the first motor and the second motor only when there is an abnormality in the first ECU.

13 Claims, 3 Drawing Sheets

(51) Int. Cl.
  *B60T 8/88*   (2006.01)
  *B60T 8/92*   (2006.01)
  *B60T 13/74*  (2006.01)
  *B60T 17/22*  (2006.01)
  *H02P 5/00*   (2016.01)

(52) U.S. Cl.
  CPC ............... *B60T 17/22* (2013.01); *H02P 5/00* (2013.01); *B60T 2270/402* (2013.01); *B60T 2270/403* (2013.01); *B60T 2270/414* (2013.01)

(58) Field of Classification Search
  CPC ............... B60T 13/74; B60T 2270/402; B60T 2270/403; B60T 2270/404
  See application file for complete search history.

(56) References Cited

FOREIGN PATENT DOCUMENTS

| KR | 10-2015-0060295 A | 6/2015 |
| KR | 10-2015-0061187 A | 6/2015 |
| KR | 10-2019-0106397 A | 9/2019 |
| KR | 10-2020-0140754 A | 12/2020 |
| KR | 20220018135 A * | 2/2022 |

OTHER PUBLICATIONS

Korean language Written Opinion (PCT/ISA/237) issued in PCT Application No. PCT/KR2021/019289 dated Mar. 29, 2022.

* cited by examiner

MOTOR DRIVING CIRCUIT FOR ELECTRONIC PARKING BRAKE SYSTEM

CROSS-REFERENCE TO RELATED APPLICATION

This application is the U.S. National Phase under 35 U.S.C. § 371 of International Patent Application No. PCT/KR2021/019289, filed on Dec. 17, 2021, which claims priority to and the benefit of Korean Patent Application No. 10-2020-0176982, filed on Dec. 17, 2020, and Korean Patent Application No. 10-2020-0176983, filed on Dec. 17, 2020, the disclosures of which are incorporated herein by reference in its entirety.

TECHNICAL FIELD

The present disclosure relates to a motor driving circuit of an electronic parking brake system, and more specifically to a motor driving circuit of an electronic parking brake system, which is capable of driving an additional motor together with increasing safety.

BACKGROUND ART

The electronic parking brake (EPB), which is also called an automatic stopping system or auto hold, functions to lock the brake by detecting the speed, engine rotation and brake operation of a vehicle when the vehicle in motion is stopped for a certain period of time.

The electronic parking brake uses a method of fixing a drum or disk by a motor which is driven by an electronic signal.

The mechanical configuration of such an electronic parking brake is described in Korean Registered Patent. No. 10-2122756 (Electronic Parking Brake for Vehicle, registered on Jun. 9, 2020).

The electronic parking brake system includes a driving circuit for driving a motor, and can be made into a released state or an apply state by driving the motor. Conventionally, when an abnormality occurs in one or more of the components constituting the ECU, the normal operation of the electronic parking brake system cannot be expected.

In addition, even when an abnormality occurs in a plurality of current supply devices, the normal operation of the electronic parking brake system cannot be expected, and thus, there has been a problem in that reliability is deteriorated.

DISCLOSURE

Technical Problem

The technical problem to be solved by the present disclosure is to provide a motor driving circuit of an electronic parking brake system, which is capable of normal operation even when an abnormality occurs in a part.

More specifically, the problem to be solved by the present disclosure is to provide a motor driving circuit, which is capable of normal operation even if an abnormality occurs in a part by providing a plurality of motor driving circuits.

Moreover, another object of the present disclosure is to provide a motor driving circuit, which is capable of controlling the driving of another motor by using one-side ECU of a motor driving circuit having a redundant structure.

Technical Solution

The motor driving circuit of an electronic parking brake system for solving the above-described problems according to the present disclosure may include a first motor and a second motor for releasing or applying a parking brake applied to different wheels, respectively; and a first ECU and a second ECU for controlling the driving of the first motor and the second motor, respectively, wherein the second ECU is prevented from intervening in the driving of the first motor and the second motor while the first ECU drives the first motor and the second motor, and controls the driving of the first motor and the second motor only when there is an abnormality in the first ECU.

In an exemplary embodiment of the present disclosure, the first ECU may include a first MCU for confirming a release or application condition of an electronic parking brake; a first driving device for outputting a switching control signal according to the control of the first MCU; a first current supply device which is switched according to a switching control signal of the first driving device to change the direction of a current and supply the current to the first motor and the second motor, respectively; and a first selection device for selectively providing the current of the first current supply device to the first motor and the second motor.

In an exemplary embodiment of the present disclosure, the second ECU may include a second MCU for confirming a release or application condition of an electronic parking brake; a second driving device for outputting a switching control signal according to the control of the second MCU; a second current supply device which is switched according to a switching control signal of the second driving device to change the direction of a current and supply the current to the first motor and the second motor, respectively; and a second selection device for selectively providing the current of the second current supply device to the first motor and the second motor.

In an exemplary embodiment of the present disclosure, the first ECU may include a first MCU for confirming a release or application condition of an electronic parking brake; a first driving device for outputting a switching control signal according to the control of the first MCU; a first current supply device which is switched according to a switching control signal of the first driving device to change the direction of a current and supply the current to the first motor and the second motor, respectively; and a first selection device for controlling the supply of a current of a battery to the first current supply device.

In an exemplary embodiment of the present disclosure, the second ECU may include a second MCU for confirming a release or application condition of an electronic parking brake; a second driving device for outputting a switching control signal according to the control of the second MCU; a second current supply device which is switched according to a switching control signal of the second driving device to change the direction of a current and supply the current to the first motor and the second motor, respectively; and a second selection device for controlling the supply of a current of a battery to the second current supply device.

In addition, the present disclosure provides a motor driving circuit, including a first motor and a second motor for releasing or applying a parking brake applied to different wheels, respectively; and a first ECU and a second ECU for controlling the driving of the first motor and the second motor, respectively, wherein the second ECU is prevented from intervening in the driving of the first motor and the second motor while the first ECU drives the first motor and the second motor, and controls the driving of the first motor and the second motor only when there is an abnormality in the first ECU, and controls the driving of a third motor while the first ECU drives the first motor and the second motor.

In an exemplary embodiment of the present disclosure, the first ECU may include a first MCU for confirming a release or application condition of an electronic parking brake; a first driving device for outputting a switching control signal according to the control of the first MCU; a first current supply device which is switched according to a switching control signal of the first driving device to change the direction of a current and supply the current to the first motor and the second motor, respectively; and a first selection device for selectively providing the current of the first current supply device to the first motor and the second motor.

In an exemplary embodiment of the present disclosure, the second ECU may include a second MCU for confirming a release or application condition of an electronic parking brake; a second driving device for outputting a switching control signal according to the control of the second MCU; a second current supply device which is switched according to a switching control signal of the second driving device to change the direction of a current and supply the current to the first motor and the second motor, respectively; and a second selection device for selectively providing the current of the second current supply device to the first motor and the second motor.

In an exemplary embodiment of the present disclosure, the first ECU may include a first MCU for confirming a release or application condition of an electronic parking brake; a first driving device for outputting a switching control signal according to the control of the first MCU; a first current supply device which is switched according to a switching control signal of the first driving device to change the direction of a current and supply the current to the first motor and the second motor, respectively; and a first selection device for controlling the supply of a current of a battery to the first current supply device.

In an exemplary embodiment of the present disclosure, the second ECU may include a second MCU for confirming a release or application condition of an electronic parking brake; a second driving device for outputting a switching control signal according to the control of the second MCU; a second current supply device which is switched according to a switching control signal of the second driving device to change the direction of a current and supply the current to the first motor and the second motor, respectively; and a second selection device for controlling the supply of a current of a battery to the second current supply device.

In an exemplary embodiment of the present disclosure, the first ECU may further include a third current supply device for selectively supplying a current of the first current supply device to the third motor; and a third selection device for controlling the supply of battery power to the third current supply device.

In an exemplary embodiment of the present disclosure, the second ECU may further include a fourth current supply device for selectively supplying a current of the second current supply device to the third motor; and a fourth selection device for controlling the supply of battery power to the fourth current supply device.

In an exemplary embodiment of the present disclosure, the first ECU may further include a fifth current supply device for providing a current to the third motor when there is an abnormality in the first current supply device.

In an exemplary embodiment of the present disclosure, the second ECU may further include a sixth current supply device for providing a current to the third motor when there is an abnormality in the second current supply device.

Advantageous Effects

The present disclosure has the effect of improving the reliability of an electronic parking brake system by configuring a plurality of motor driving circuits to drive the motor by using the driving circuit on the other side when an abnormality occurs in some components.

In addition, the present disclosure has the effect of increasing system efficiency by driving a motor of the electronic parking brake system by using a plurality of ECUs and controlling the driving of other motors by using an extra ECU.

MODES OF THE INVENTION

Figure 1:
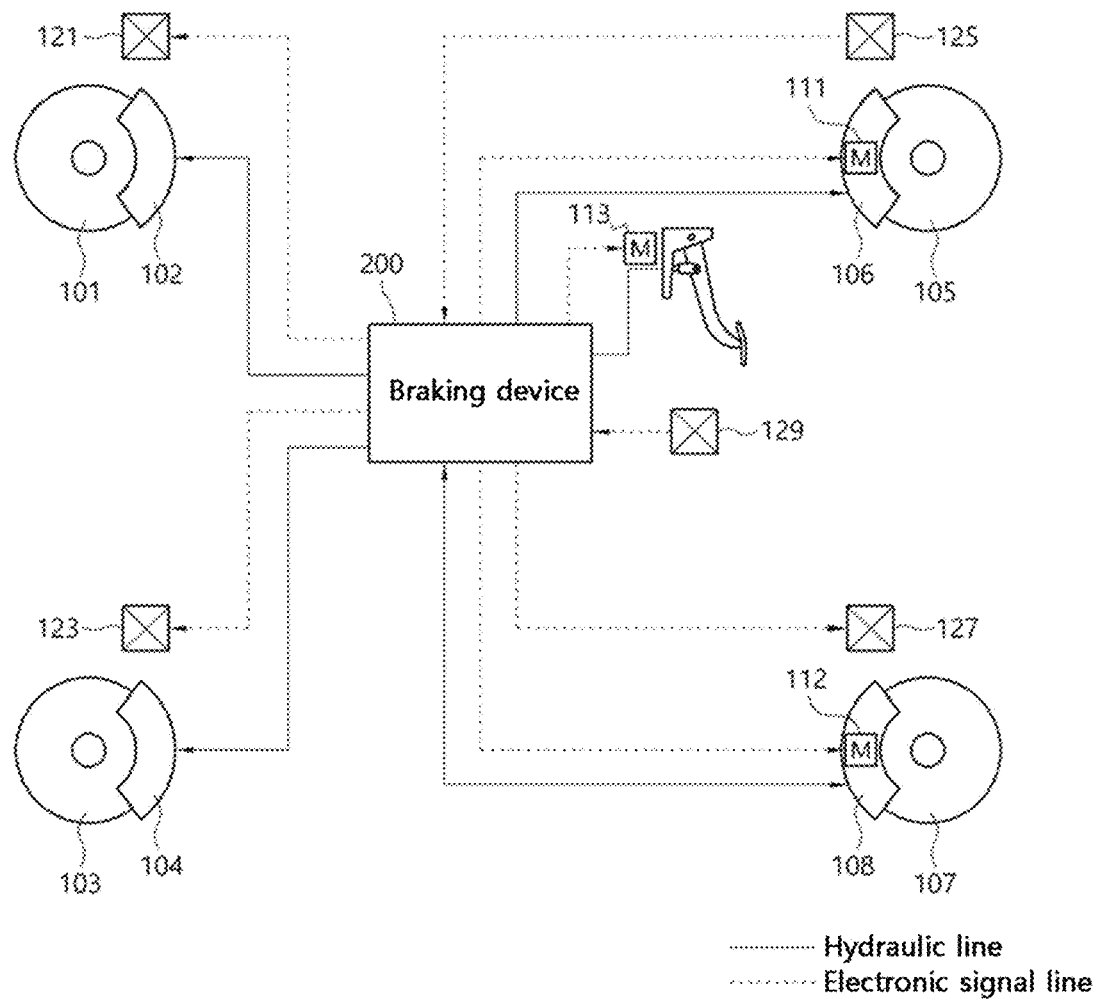
FIG. 1 is a block diagram of a braking device to which the present disclosure is applied.

Hereinafter, the motor driving circuit of an electronic parking brake system according to the present disclosure will be described in detail with reference to the accompanying drawings.

The exemplary embodiments of the present disclosure are provided to describe the disclosure more fully to those of ordinary skill in the art. Exemplary embodiments described below may be modified in different forms, and the scope of the present disclosure is not limited thereto. Rather, these exemplary embodiments are provided so that the present disclosure will be thorough and complete and will fully convey the spirit of the present disclosure to those of ordinary skill in the art.

Terms used herein are intended to describe particular exemplary embodiments and are not intended to limit the scope of the present disclosure. Unless the context clearly indicates otherwise, a singular form may include a plural form. As used herein, the terms "comprise" and/or "comprising" specify the presence of mentioned shapes, numbers, steps, operations, members, elements and/or groups thereof, but do not exclude the presence or addition of at least one other shape, number, step, operation, member, element and/or group thereof. As used herein, the term "and/or" includes any and all combinations of one or more of the associated listed items.

The terms "first," "second" and the like are used to describe various members, areas and/or regions, but do not limit such members, parts, areas, layers and/or regions. These terms do not mean a certain order, top or bottom or priority and are used only to distinguish one member, area or region from another member, area or region. Therefore, a first member, area or region may indicate a second member, area or region without deviating from the spirit of the present disclosure.

Hereinafter, the exemplary embodiments of the present disclosure will be described below with reference to drawings which schematically illustrate the exemplary embodiments. In the drawings, illustrated shapes may change according to, for example, manufacturing technology and/or tolerance. Accordingly, the exemplary embodiments of the present disclosure should not be construed as limited to specific shapes of areas illustrated herein and include changes in shapes that may occur during manufacturing.

FIG. 1 is a view showing the schematic structure of an electronic parking brake system according to an exemplary embodiment of the present disclosure.

Referring to FIG. 1, the electronic parking brake system largely includes a brake pedal, wheels of a vehicle 101, 103, 105, 107, calipers 102, 104, 106, 108 for applying a braking force to each of the wheels 101, 103, 105, 107, wheel speed sensors (WSS) 101, 103, 105, 107 for checking the rotational speed of each of the wheels 101, 103, 105, 107, a PTS 129, motors 111, 122 for controlling the driving of a parking brake formed so as to be electronically operated through an external force on rear wheels 105, 107 of the vehicle and a braking device 200.

A first wheel 101 and a second wheel 103 are formed at the front of the vehicle, and when an external force is applied to brake pedals on the first wheel 101 and the second wheel 103, a first caliper 102 and a second caliper 104 for applying a braking force to each of the wheels 101, 103 are formed. In addition, a third wheel 105 and a fourth wheel 107 are formed at the rear of the vehicle, and when an external force is applied to brake pedals on the third wheel 105 and the fourth wheel 107, a third caliper 106 and a fourth caliper 108 for applying a braking force to each of the wheels 105, 107 are formed. Moreover, when an external force is generated in an electric parking brake (EPB) switch, the first motor 111 and the second motor 112 for controlling the driving of the wheels 105, 107 of the vehicle by driving the electronically operated parking brake are formed. The third motor 113 is a pedal hidden motor that operates when the pedal is hidden in the autonomous driving state.

In addition, the WSSs 121, 123, 125, 127 check the wheel rotation speed and provide it to the braking device 200, and the PTS 129 is a pedal sensor, which detects an external force generated on the brake pedal from the outside of the vehicle and provides it to the braking device 200. The braking device 200 operates the calipers 102, 104, 106, 108 based on signals provided from the PTS 129 to apply a braking force to each of the wheels 101, 103, 105, 107.

Figure 2:
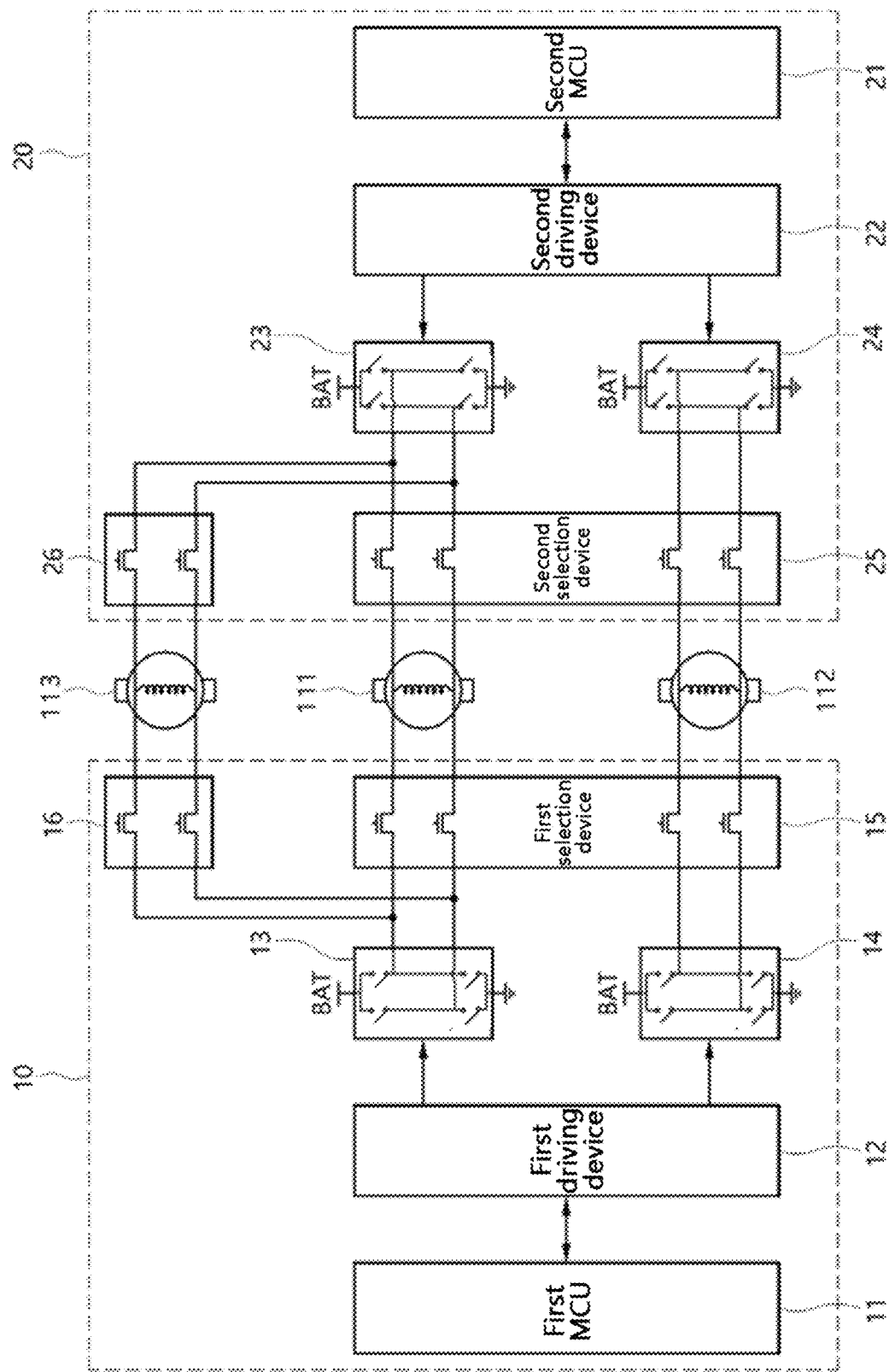
FIG. 2 is a block diagram of the motor driving circuit according to a preferred exemplary embodiment of the present disclosure.

FIG. 2 is a block diagram of the motor driving circuit according to a preferred exemplary embodiment of the present disclosure.

Referring to FIG. 2, the present disclosure may be the configuration of an ECU block inside the braking device 200 described above with reference to FIG. 1, and may include a first motor 111 and a second motor for releasing or applying parking brakes of the left rear wheel and the right rear wheel, respectively, and a first ECU 10 and a second ECU 20 for controlling the driving of the first motor 111 and the second motor 112, respectively, and while the first ECU 10 drives the first and second motors 111, 112, the second ECU 20 does not intervene in the driving of the first and second motors 111 and 112, and the second ECU 20 controls the driving of the first and second motors 111, 112 only when there is an abnormality in the first ECU 10.

In addition, while the first ECU 10 drives the first and second motors 111, 112, the idle second ECU 20 may drive the third motor 113, and conversely, while the first and second motors 111, 112 are driven by the ECU 20, the idle first ECU 10 may drive the third motor 113. The third motor 113 may be a pedal hidden motor as described with reference to FIG. 1.

The first ECU 10 includes a first MCU 11 for confirming a release or application condition for of the electronic parking brake, a first driving device 12 for outputting a switching control signal according to the control of the first MCU 11, a first current supply device 13 and a second current supply device 14 which are switched according to a switching control signal of the first driving device 12 to change the direction of a current to supply the current to the first motor 111 and the second motor 112, respectively, a first selection device 15 which is capable of selectively blocking the supply of a current of the first current supply device 13 and the second current supply device 14 to the first motor 20 and the second motor 112, and a third selection device 16 which is capable of selectively supplying the current of the first current supply device 13 or the second current supply device 14 to the third motor 113.

The second ECU 20 is substantially the same redundancy circuit as the first ECU 10, and includes a second MCU 21, a second driving device 22, a third current supply device 23, a fourth current supply device 24, a second selection device 25 and a fourth selection device 26.

Each of the first selection device 15 and the second selection device 25 includes switching elements that are switched according to a control signal of an upper controller.

The first selection device 15 opens or closes a current supply line connecting the first current supply device 13 and the first motor 111 and a current supply line connecting the second current supply device 14 and the second motor 112.

Likewise, the second selection device 25 also opens or closes a current supply line connecting the third current supply device 23 and the first motor 111 and a current supply line connecting the fourth current supply device 24 and the second motor 112.

Moreover, while FIG. 2 illustrates that the third selection device 16 opens or closes the current supply line to selectively control the supply of the current of the first current supply device 13 to the third motor 113, it is possible to selectively supply the current of the second current supply device 14 to the third motor 113.

Similarly, the fourth selection device 26 may selectively control the supply of the current of the third current supply device 23 or the fourth current supply device 24 to the third motor 113.

With this configuration, an ECU for controlling the driving of the first motor 111 and the second motor 112 may be selected by using the first selection device 15 and the second selection device 25.

If there is an abnormality in the first MCU 11, the first driving device 12, the first current supply device 13, or the second current supply device 14 constituting the first ECU 10, the upper controller (not illustrated in the drawing) makes all of the switching elements of the first selection device 15 in an open state, and closes all of the switching elements of the second selection device 25 to connect the third current supply device 23 and the first motor 111, and in addition, by connecting the fourth current supply device 24 and the second motor 112, the second ECU 20 may control the driving of the first motor 111 and the second motor 112.

With this configuration, when an abnormality occurs in one of the first ECU 10 or the second ECU 20, it is possible to control the driving of the first motor 111 and the second motor 112 by using the other one having no abnormality, and thus, reliability is improved.

In addition, when both of the first ECU 10 and the second ECU 20 operate normally, an idle ECU is generated in addition to the ECUs that drive the first motor 111 and the second motor 112, and it is possible to control the driving of the third motor 113 by using the idle ECU, thereby increasing the effectiveness of the circuit.

Figure 3:
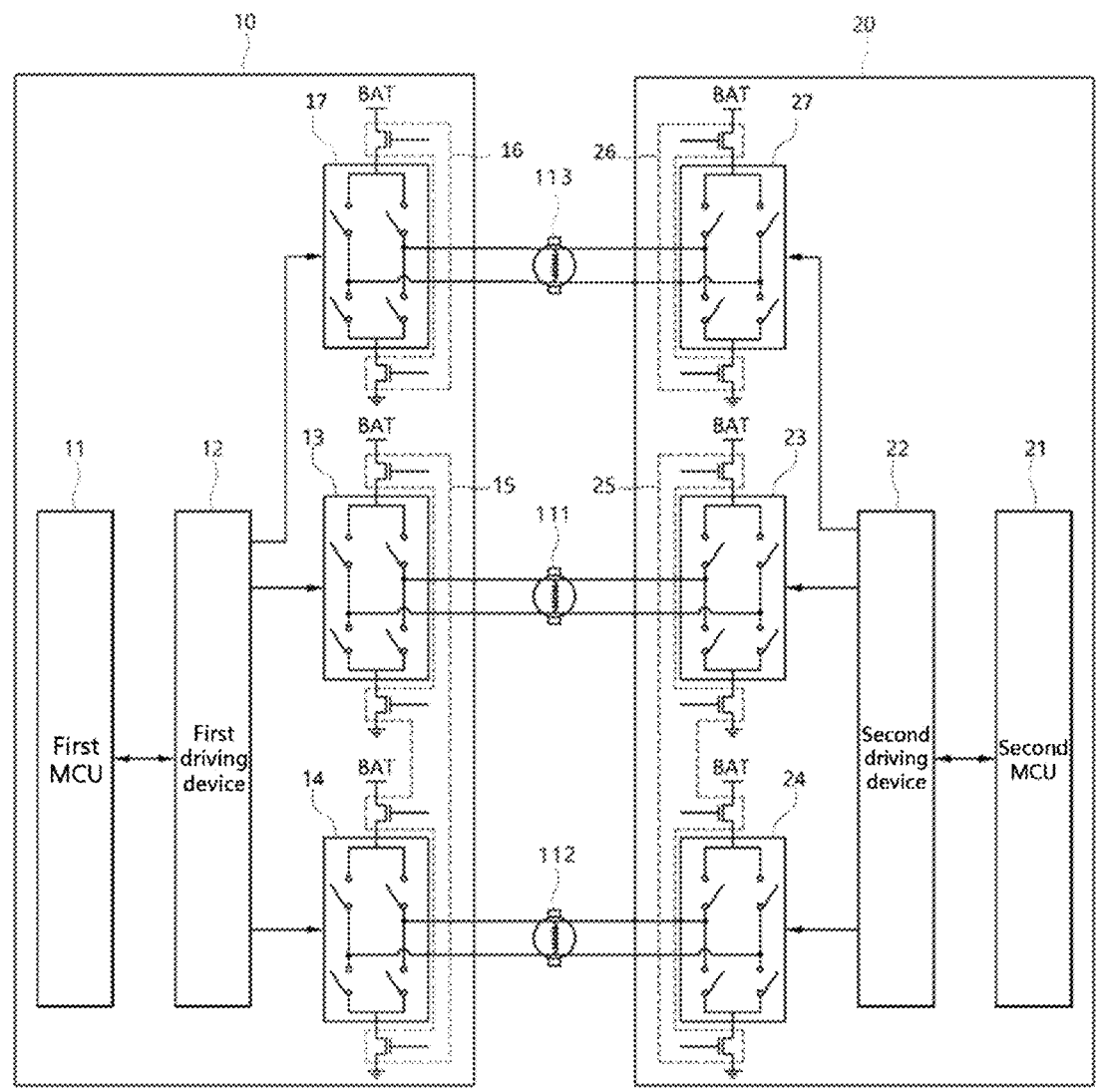
FIG. 3 is a block diagram of the motor driving circuit according to another exemplary embodiment of the present disclosure.

FIG. 3 is a block diagram of the motor driving circuit of an electronic parking brake system according to another exemplary embodiment of the present disclosure.

FIG. 3 shows another configuration of the first selection device 15 and the second selection device 25.

In the preceding example, each of the first selection device 15 and the second selection device 25 has been described as closing or opening a current supply line for supplying current to the first motor 111 and the second motor 112, but the current supply line is in a closed state, and the first selection device 15 and the second selection device 25 have the configuration of a switching circuit that supplies or cuts off the power of a battery that is supplied to the first current supply device 13, the second current supply device 14, the third current supply device 23 and the fourth current supply device 24.

The first to fourth current supply devices 13, 14, 23, 24 have an H-bridge-type structure including a parallel pair of two transistors connected in series between a battery and a ground, respectively, and depending on the on-off state of each transistor, the direction of the current is changed according to the power source (BAT) of a battery to supply it to the first motor 111 and the second motor 112.

The first selection device 15 controls the supply of battery power (BAT) to the first current supply device 13 and the second current supply device 14, and the second selection device 25 controls the supply of battery power (BAT) to the third current supply device 23. and the fourth current supply device 24.

Accordingly, when the first ECU 10 drives the first motor 111 and the second motor 112, The first selection device 15 supplies battery power (BAT) to the first current supply device 13 and the second current supply device 14, and the second selection device 25 blocks battery power (BAT) supplied to the third current supply device 23 and the second current supply device 14 such that the second ECU 20 does not affect the driving of the first motor 111 and the second motor 112.

When an abnormality occurs in the first ECU 10, the first selection device 15 cuts off the battery power (BAT) to the first current supply device 13 and the second current supply device 14, and the second selection device 25 supplies the battery power (BAT) to the third current supply device 23 and the fourth current supply device 24 such that it is possible to drive the first motor 111 and the second motor 112 by the second ECU 20.

In order to individually drive the third motor 113, the first ECU 10 and the second ECU 20 further include a fifth current supply device 17 and a sixth current supply device 27, respectively.

In this case, the third selection device 16 may supply or cut off battery power (BAT) as the power source of the fifth current supply device 17, and the fourth selection device 26 may control the supply of the battery power (BAT) to the sixth current supply device 27.

In the example of FIG. 3, when the first motor 111 and the second motor 112 are driven by the first ECU 10, the second ECU 20 may drive the third motor 113, and conversely, when the first motor 111 and the second motor 112 are driven by the second ECU 20, the first ECU 10 may control the driving of the third motor 113.

The characteristic of FIG. 3 is that a fifth current supply device 17 and a sixth current supply device 27, which are current supply devices for driving the third motor 113, are further added to the first ECU 10 and the second ECU 20, respectively, and thus, even when there is an abnormality in the first current supply device 13 or the second current supply device 14, it is possible to drive the third motor 113 by using the fifth current supply device 17.

As described above, when an abnormality occurs in the first current supply device 13, the first ECU 10 is not used to control the first motor 111 and the second motor 112, and the second ECU 20, which is a redundant configuration, may drive the first motor 111 and the second motor 112.

In this case, the configuration of the third motor 113 is difficult in the example illustrated in FIG. 2, but in the configuration including the fifth current supply device 17 and the third selection device 16 for supplying battery power to the fifth current supply device 17, it is possible to drive the third motor 113 by the first ECU 10 having an abnormality.

It will be apparent to those of ordinary skill in the art that the present disclosure is not limited to the above exemplary embodiments and may be variously changed and modified within the scope without departing from the technical gist of the present disclosure.

10: First ECU
11: First MCU
12: First driving device
13: First current supply device
14: Second current supply device
15: First selection device
16: Third selection device
20: Second ECU
21: Second MCU
22: Second driving device
23: Third current supply device
24: Fourth current supply device
25: Second selection device
26: Fourth selection device
111: First motor
112: Second motor
113: Third motor

The invention claimed is:

1. A motor driving circuit, comprising:
a first motor and a second motor for releasing or applying a parking brake applied to different wheels, respectively; and
a first ECU and a second ECU for controlling a driving of the first motor and the second motor, respectively,
wherein the second ECU is prevented from intervening in the driving of the first motor and the second motor while the first ECU drives the first motor and the second motor, and controls the driving of the first motor and the second motor only when there is an abnormality in the first ECU,
wherein the first ECU comprises:
a first MCU for confirming a release or application condition of the parking brake;
a first driving device for outputting a first switching control signal according to a first control of the first MCU;
a first current supply device which is switched according to the first switching control signal of the first driving device to change a direction of a current of the first current supply device and supply the current of the first current supply device to the first motor and the second motor respectively; and
a first selection device for selectively providing the current of the first current supply device to the first motor and the second motor.

2. The motor driving circuit of claim 1, wherein the second ECU comprises:
   a second MCU for confirming the release or application condition of the parking brake;
   a second driving device for outputting a second switching control signal according to a second control of the second MCU;
   a second current supply device which is switched according to the second switching control signal of the second driving device to change the direction of a current of the second current supply device and supply the current of the second current supply device to the first motor and the second motor, respectively; and
   a second selection device for selectively providing the current of the second current supply device to the first motor and the second motor.

3. The motor driving circuit of claim 1, wherein
   the first selection device controls a supply of a current of a battery to the first current supply device.

4. The motor circuit device of claim 3, wherein the second ECU comprises:
   a second MCU for confirming the release or application condition of the parking brake;
   a second driving device for outputting a second switching control signal according to a second control of the second MCU;
   a second current supply device which is switched according to the second switching control signal of the second driving device to change the direction of a current of the second current supply device and supply the current of the second current supply device to the first motor and the second motor, respectively; and
   a second selection device for controlling the supply of the current of the battery to the second current supply device.

5. A motor driving circuit, comprising:
   a first motor and a second motor for releasing or applying a parking brake applied to different wheels, respectively; and
   a first ECU and a second ECU for controlling a driving of the first motor and the second motor, respectively,
   wherein the second ECU is prevented from intervening in the driving of the first motor and the second motor while the first ECU drives the first motor and the second motor, controls the driving of the first motor and the second motor only when there is an abnormality in the first ECU, and controls the driving of a third motor operated when a pedal is hidden while the first ECU drives the first motor and the second motor.

6. The motor driving circuit of claim 5, wherein the first ECU comprises:
   a first MCU for confirming a release or application condition of the parking brake;
   a first driving device for outputting a first switching control signal according to a first control of the first MCU;
   a first current supply device which is switched according to the first switching control signal of the first driving device to change a direction of a current of the first current supply device and supply the current of the first current supply device to the first motor and the second motor, respectively; and
   a first selection device for selectively providing the current of the first current supply device to the first motor and the second motor.

7. The motor driving circuit of claim 6, wherein the second ECU comprises:
   a second MCU for confirming the release or application condition of the parking brake;
   a second driving device for outputting a second switching control signal according to a second control of the second MCU;
   a second current supply device which is switched according to the second switching control signal of the second driving device to change the direction of a current of the second current supply device and supply the current of the second current supply device to the first motor and the second motor, respectively; and
   a second selection device for selectively providing the current of the second current supply device to the first motor and the second motor.

8. The motor driving circuit of claim 5, wherein the first ECU comprises:
   a first MCU for confirming a release or application condition of the parking brake;
   a first driving device for outputting a first switching control signal according to a first control of the first MCU;
   a first current supply device which is switched according to the first switching control signal of the first driving device to change a direction of a current of the first current supply device and supply the current of the first current supply device to the first motor and the second motor, respectively; and
   a first selection device for controlling a supply of a current of a battery to the first current supply device.

9. The motor driving circuit of claim 8, wherein the second ECU comprises:
   a second MCU for confirming the release or application condition of the parking brake;
   a second driving device for outputting a second switching control signal according to the control of the second MCU;
   a second current supply device which is switched according to the second switching control signal of the second driving device to change the direction of a current of the second current supply device and supply the current of the second current supply device to the first motor and the second motor, respectively; and
   a second selection device for controlling the supply of the current of the battery to the second current supply device.

10. The motor driving circuit of claim 7, wherein the first ECU further comprises:
    a third current supply device for selectively supplying the current of the first current supply device to the third motor; and
    a third selection device for controlling a supply of battery power to the third current supply device.

11. The motor driving circuit of claim 10, wherein the second ECU further comprises:
    a fourth current supply device for selectively supplying the current of the second current supply device to the third motor; and
    a fourth selection device for controlling the supply of the battery power to the fourth current supply device.

12. The motor driving circuit of claim 5, wherein the first ECU further comprises:
    a fifth current supply device for providing a current of the fifth current supply device to the third motor when there is an abnormality in the first current supply device.

13. The motor driving circuit of claim 12, wherein the second ECU further comprises:

a sixth current supply device for providing a current of the sixth current supply device to the third motor when there is an abnormality in the second current supply device.

\* \* \* \* \*